United States Patent [19]
Creswick et al.

[11] Patent Number: 5,937,125
[45] Date of Patent: Aug. 10, 1999

[54] DETACHABLE FIBER OPTIC CONNECTOR WITH IMPROVED OPTICAL SUB-ASSEMBLY AND NOSE BLOCK

[75] Inventors: Steven B. Creswick; Shawki S. Ibrahim, both of West Lafayette; Donald A. Pearson, II, Lafayette; David L. Morse, West Lafayette; J. Scott Bechtel, Lafayette, all of Ind.

[73] Assignee: CTS Corporation, Elkhart, Ind.

[21] Appl. No.: 08/914,097

[22] Filed: Aug. 19, 1997

Related U.S. Application Data

[60] Provisional application No. 60/001,829, Aug. 2, 1995.

[51] Int. Cl.⁶ .................................................. G02B 6/42
[52] U.S. Cl. .................. 385/88; 385/75; 385/94
[58] Field of Search ................. 385/88, 75, 92, 385/94, 93, 49

[56] References Cited

U.S. PATENT DOCUMENTS

| | | | |
|---|---|---|---|
| 5,345,530 | 9/1994 | Lebby et al. ........................... | 385/88 |
| 5,436,997 | 7/1995 | Makiuchi et al. ....................... | 385/92 |
| 5,574,814 | 11/1996 | Noddings et al. ...................... | 385/90 |

*Primary Examiner*—John D. Lee
*Assistant Examiner*—Ellen E. Kang
*Attorney, Agent, or Firm*—Albert W Watkins; Michael W. Starkweather

[57] ABSTRACT

A detachable fiber optic connector has an improved nose block (800) which enhances cooling of power dissipating components, simplifies assembly, improves yield and reduces cost. The improved nose block (800) includes an upper tray (802) and lower tray (804) which slidingly receive an improved aluminum nitride optical subassembly (700). The subassembly (700) and nose block (800) are held together, properly aligned, and then fixated. The nose block (800) also has symmetrical protrusions (850) which allow the nose block (800) to be placed easily and precisely into mating protrusions (230, 240) in a seal ring (200). The nose block (800) provides a direct thermal pathway between power dissipating components, such as an opto-electronic component (750) and optical driver IC (730), and an aluminum package base (400). Various alternative nose blocks (810, 820, 830) are illustrated, and an alternative base (410) is also shown. The package is completely sealed to ensure field reliability, and manufactured using low cost processes.

20 Claims, 15 Drawing Sheets

DETACHABLE FIBER OPTIC CONNECTOR WITH IMPROVED OPTICAL SUB-ASSEMBLY AND NOSE BLOCK

CROSS REFERENCE TO RELATED APPLICATIONS

This application is a continuation-in-part of U.S. patent application Ser. No. 60/001,829 filed Aug. 2, 1995 entitled "Detachable Fiber Optic Connector With Improved Optical Sub-Assembly and Nose Block."

BACKGROUND OF THE INVENTION

1. Field of the Invention

This invention pertains to fiber optic connectors generally, and specifically to an improved optical sub-assembly and nose block used therein. The detachable connectors of the present invention deliver excellent performance, and are manufacturable using few piece parts and low cost processes and techniques.

2. Description of the Related Art

Fiber optics offer much hope for the future of communications and computing. Optical energy may be modulated at much higher frequencies than electrical energy. In addition, and unlike electrical energy, optical energy can be constrained within small fibers. Optical fibers allow multiple secure high bandwidth transmissions to occur within close physical proximity of each other. The long distance telecommunications and military industries have gained much benefit from fiber optics.

However, the cost of fiber optics has been so great as to present an obstacle to wide spread applications such as desktop computing or local area networks. Fiber optics have only been applied where benefits were great enough to offset the formidable cost. Much research has been devoted to ways of achieving the benefits of fiber optics without the high cost, both by the present assignee and others in the field.

There are several factors which tend to keep the cost of fiber optics high. Among these are the need for precision alignment and exclusion of foreign matter, both which would otherwise lead to undesirable losses of optical signal. When the center to center axial alignment of two 100 micrometer fibers is mismatched by only 10 micrometers, there is a resultant 0.6 db loss in optical signal strength. The manufacturing processes involved in alignment to that precision are challenging. Since foreign matter can also block optical transmission across any junctions which are not sealed, manufacturing processes must not only cater to precise alignment, but must also address cleanliness of the interconnection and appropriate sealing.

To compound the issue even further, optical fiber is made from high-purity glass materials, and although somewhat flexible, the fiber is still brittle and may be easily damaged. Component design and manufacturing processes therefore must also cater to the fragile fiber.

Opto-electronic components are inefficient at converting electrical energy to optical energy, and, as a result, these components often dissipate large amounts of thermal energy. Cooling the higher power components to ensure they do not overheat, and to extend component operating life, is very important. Cooling also comes at a cost, requiring some form of heat sinking and more expensive mounting. Other factors which contribute to the cost of fiber optics are beyond the scope of this disclosure and so will not be considered herein.

Prior art fiber optic connectors are illustrated in U.S. Pat. Nos. 5,434,941, 5,450,515, and 5,452,390, incorporated herein by reference. In those prior art designs, great care was taken to ensure the hermeticity of the connector package to prevent influx of contaminants or corrosive agents which might affect long term reliability. Unfortunately, the requirements for hermeticity can not be achieved in the present day art without significant expense.

In addition, the prior art designs used an optical sub-assembly which only supported the opto-electronic device. All other electronics were mounted upon a multi-layer glass and ceramic substrate commonly referred to as Low Temperature Co-fired Ceramic, or LTCC. The high power driver that directly connects to the opto-electronic device, in transmitter applications, was mounted on the LTCC substrate. In order to cool the driver, special thermal vias and heat spreaders were required. The physical separation between the driver or receiver electronics mounted on the LTCC and opto-electronic components mounted on the optical sub-assembly also resulted in the potential for undesirable circuitry cross-talk and ringing.

SUMMARY OF THE INVENTION

The present invention overcomes the limitations of the prior art through selection of particular material compositions and specific physical geometries and placements to achieve improved thermal performance combined with a reduction in piece parts and resulting improved production yield. The present invention achieves these benefits by placing critical opto-electronic components on a common substrate with immediately associated amplifier circuitry. The common substrate, which may be made from aluminum nitride or other selected material, is directly supported by a nose block and the nose block is directly supported by a thermally and electrically conductive base. In one embodiment, adjacent to the nose block on a surface opposite the base is an electrically and thermally conductive cover. The base and cover combine with the nose block and common substrate to form an efficient thermal pathway with few thermal junctions. The base and cover also provide electrical shielding to the sensitive or high power electronic and opto-electronic components. Special features within the nose block enable the common substrate to be easily placed and held for precision alignment. Additional features within the nose block enable drop-in placement of the nose block into the seal ring. The nose block may be machined, or precision molded from powdered metal or plastic.

DESCRIPTION OF THE PREFERRED EMBODIMENT

Figure 1:
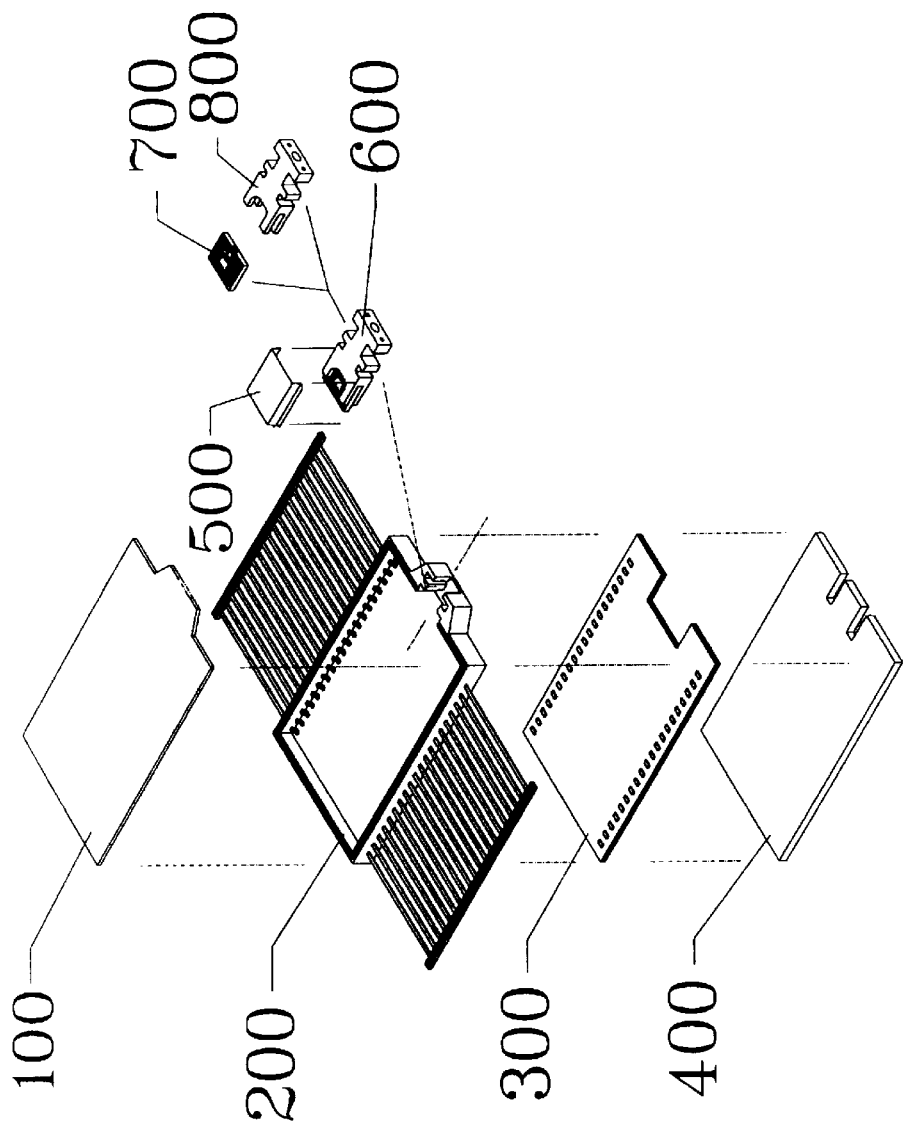
FIG. 1 illustrates an exploded view of the preferred embodiment of the invention.

FIG. 1 illustrates by exploded view the major components used in the construction of the preferred embodiment of the invention. Therein, a base 400 is preferably made of aluminum. though other materials may be suitable, depending upon the application. Aluminum is preferred for high thermal conductivity, electrical shielding properties, durability, low cost, ability to be passivated, and ease of manufacture. On top of base 400 is a Low Temperature Co-fired Ceramic (LTCC) substrate 300. LTCC substrate 300 may have many layers of circuit wiring, and may also include components such as resistors buried therein or deposited on the surface thereof. Though not illustrated, a large number of active and passive electronic devices may be mounted on top of LTCC substrate 300, as is well-known in the art. Surrounding LTCC substrate 300 and mounted onto base 400 is seal ring 200, which is manufactured by precision injection molding a plastic compound. Optical assembly 600, which includes nose block 800, optical sub-assembly 700 and optional cover 500, mates with seal ring 200. Optical assembly 600 is in direct thermal contact with base 400. Seal ring 200 is enclosed by cover 100 to complete the assembly.

Figure 2:
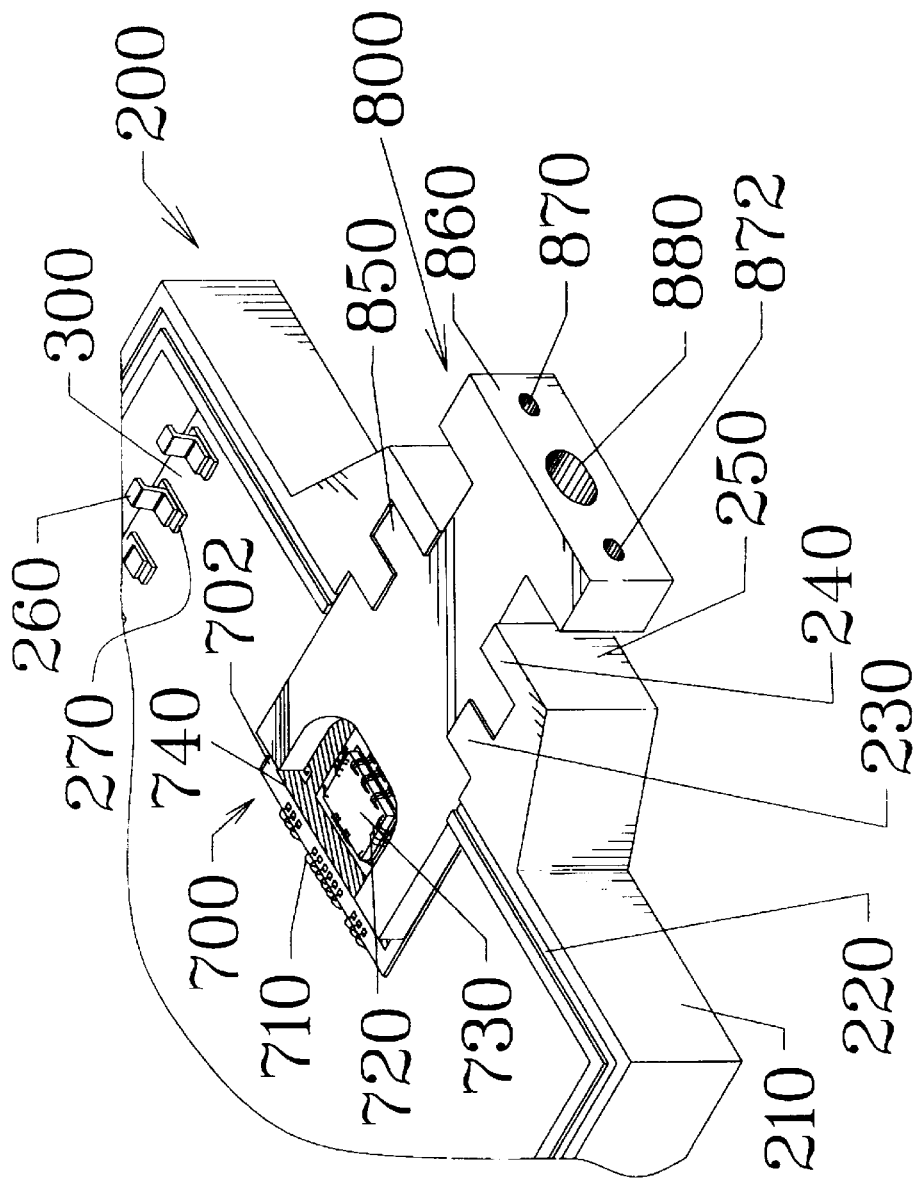
FIGS. 2 and 3 illustrate the nose block of FIG. 1 in greater detail.
Figure 3:
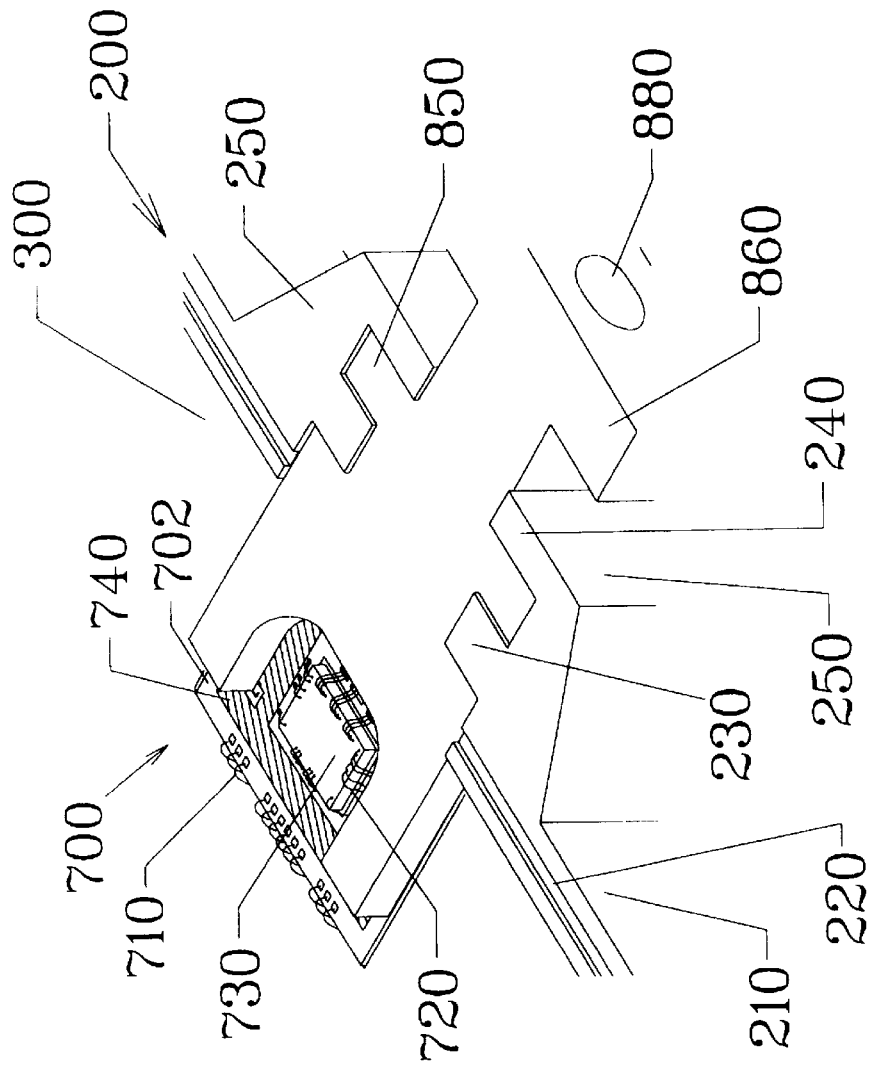

FIGS. 2 and 3 illustrate the interconnections between nose block 800 and seal ring 200. Seal ring 200 has a generally rectangular exterior wall 210. Protruding from wall 2 1 0 is nose block receptor 250. Within nose block receptor 250 are protruding flanges 230 and 240. Nose block 800 has a first protruding flange 850 which is designed to mate with protruding flanges 230 and 240 of nose block receptor 250. These mating flanges 230, 240 and 850 extend parallel to each other in a vertical direction, allowing nose block 800 to be dropped down into nose block receptor 250 along a vertical axis. Due to their mating characteristics, flanges 230, 240 and 850 serve to retain nose block 800 within nose block receptor 250 along the remaining axes.

Nose block 800 may preferably be designed to include a detachable fiber optic fastener 860 to mate with detachable fiber optics such as were disclosed in U.S. Pat. Nos. 5,434, 941, 5,450,515, and 5,452,390, incorporated previously by reference. Those prior art fiber optics require two small threaded holes 870 and 872 though which a bolt or screw may pass. In addition, a fiber and ferrule combination passes into optic opening 880. Within optic opening 880 may, for example, be a ball lens which has been pressed into place. Alternatively, a mating ferrule and fiber stub may be positioned, or other similar optic interface means may be used as will be apparent to one of ordinary skill in the art. In the preferred embodiment a ball lens is used, which tends to simplify construction and later alignment processes.

Supported within nose block 800 is optical sub-assembly 700. Optical sub-assembly 700 is designed to support opto-electronic components as well as the necessary drivers for transmitters, or pre-amplifiers in the case of opto-electronic receivers, directly upon an aluminum nitride substrate 702. Aluminum nitride is used in the preferred embodiment for substrate 702 because of intrinsic high thermal conductivity, low toxicity and low thermal expansion. In the illustrated preferred embodiment, driver integrated circuit 730 is a power driver circuit used to directly drive an optical transmitter. Driver IC 730 is electrically connected to circuit traces formed upon substrate 702 through wire bonds 720, though other methods of electrical connection are known in the art. A dielectric covercoat 740 is also patterned upon substrate 702 to provide electric isolation and protection for any circuit traces and components which might be formed upon substrate 702. Optical sub-assembly 700 may be electrically connected to LTCC substrate 300 through wire bonds 710 as shown in the preferred embodiment, though, as with wire bonds 720, any suitable interconnections may be used.

Electrical interconnection from LTCC substrate 300 to the exterior of the package is achieved in the preferred embodiment through termination pads 270 formed upon LTCC substrate 300. Pads 270 are brazed, soldered or otherwise electrically and mechanically connected to lead terminations 260. Lead terminations are an integral part of lead frame 280, discussed hereinbelow.

At the time of precision molding, small attachment groove 220 is formed into seal ring 200. This groove, which is most visible in FIGS. 2 and 3, is used during final assembly to assist with attachment of cover 100. Cover 100 may be attached using a small bead of adhesive retained within attachment groove 220.

Figure 4:
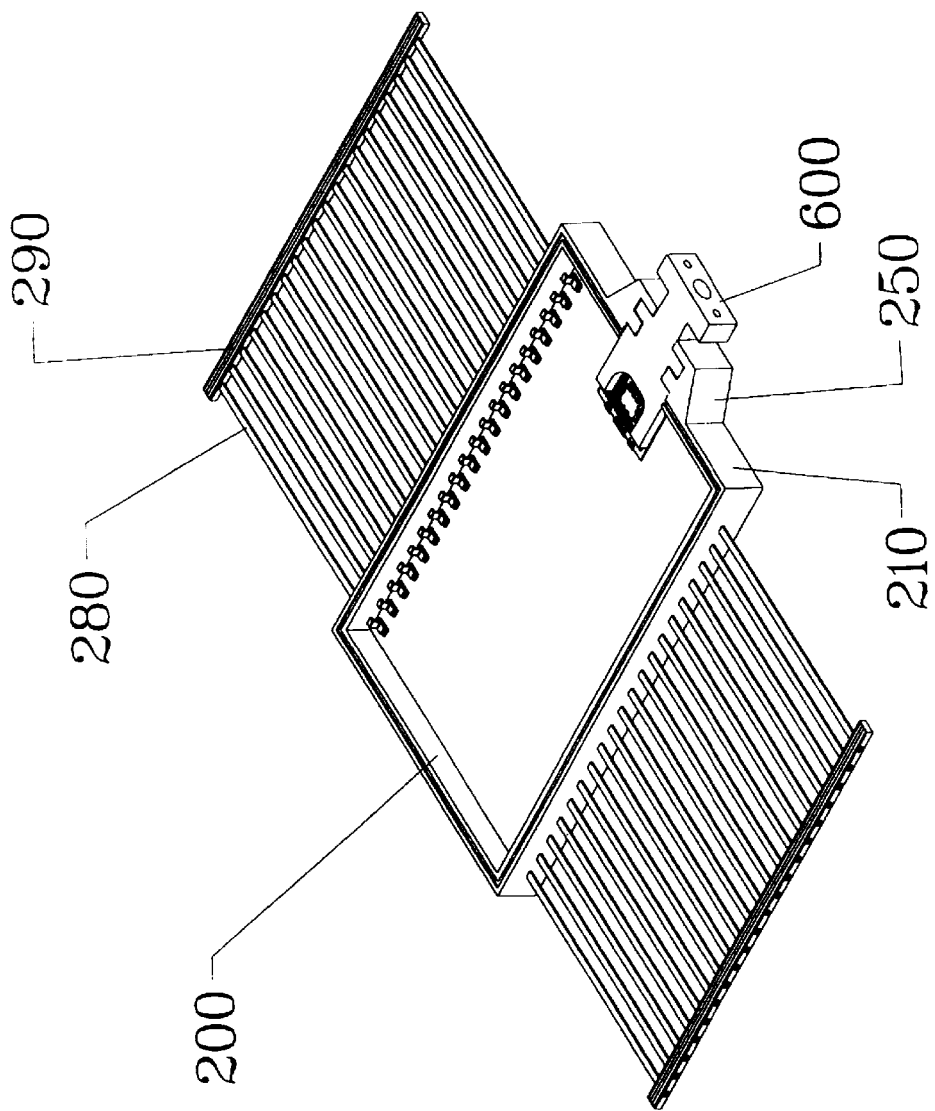
FIG. 4 illustrates a projected view of the embodiment of FIG. 1.

FIG. 4 illustrates the preferred embodiment by assembled projected view with cover 100 removed. During precision molding of seal ring 200, lead frame 280 is positioned and plastic tie bars 290 formed. Plastic tie bars 290 prevent later damage to lead frame 280, while still preserving electrical isolation among each of the individual leads within lead frame 280 for testing purposes. Lead terminations 260 may be formed from lead frame 280 prior to or after molding.

Figure 5:
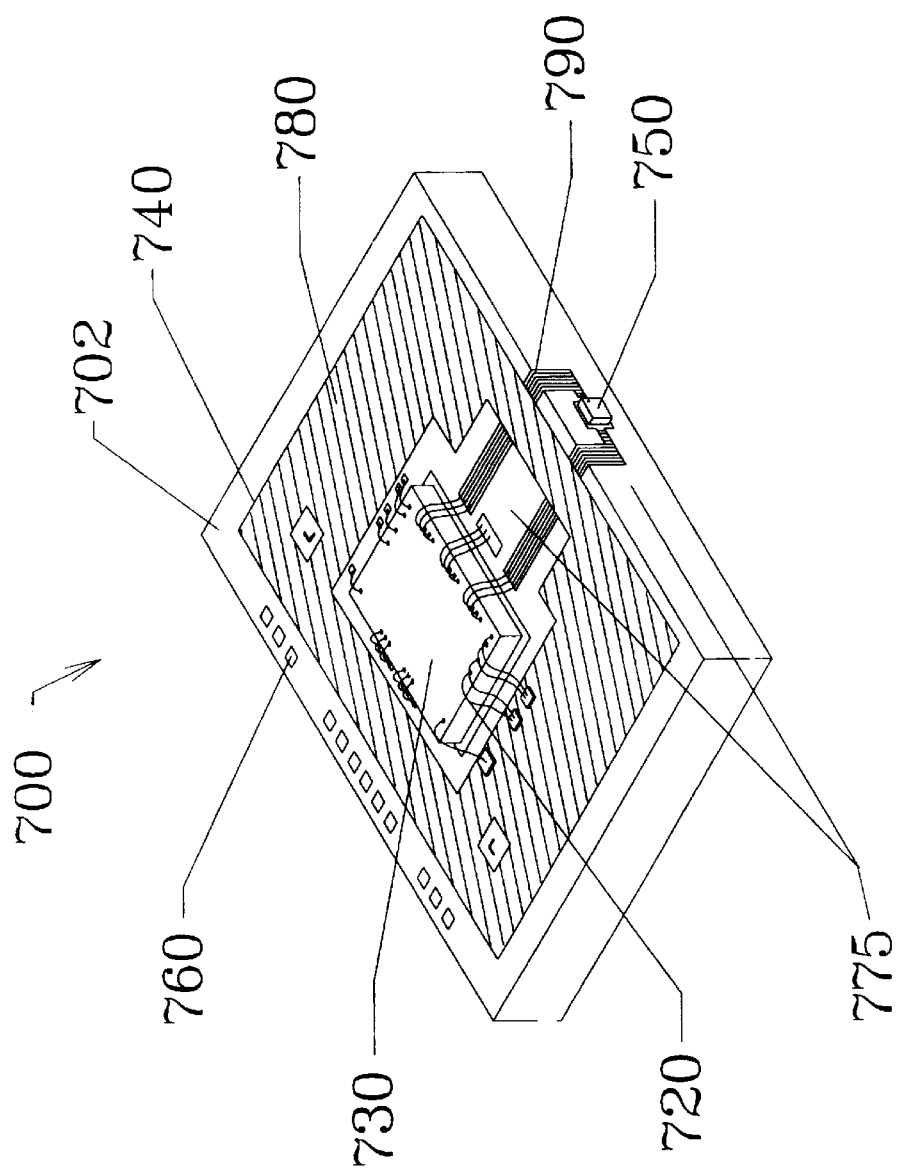
FIG. 5 illustrates the optical sub-assembly of FIG. 1 in detail by projected view.

The optical sub-assembly 700 is shown in more detail in FIG. 5. Not visible in other figures are the opto-electronic component 750, which may be a transmitter or receiver of optical energy. As aforementioned, in the preferred embodiment an optical transmitter is used. Electrical interconnection between opto-electronic component 750 and driver 730 is accomplished through surface metallization 790, which is used to form the electrical routing upon aluminum nitride substrate 702. At the end of metallization 790 remote from opto-electronic component 750, wire bonds 720 bond metallization 790 to driver IC 730. The interconnection path of opto-electronic component 750 to driver IC 730 is very short, ensuring low-inductance and thereby optimizing the circuit layout for higher frequencies. In addition, short leads reduce the amount of radiated energy, in some cases eliminating the need for additional shielding. Where a receiver is used for opto-electronic component 750, the short lengths minimize electromagnetic interference. The sensitivity of a receiver is thereby optimized, and, once again, the need for additional shielding may be eliminated.

In the preferred embodiment, surface metallization 790 extends under dielectric covercoat 740. However, for those applications requiring more complex circuit patterns, additional metallization may be formed upon surface 780 of dielectric 740. Termination pads 760 are provided for later wire bonding through wire bonds 710. Additional surface space 775 is provided on substrate 702 in the event additional components are desired or required to be mounted on optical subassembly 700.

Figure 6:
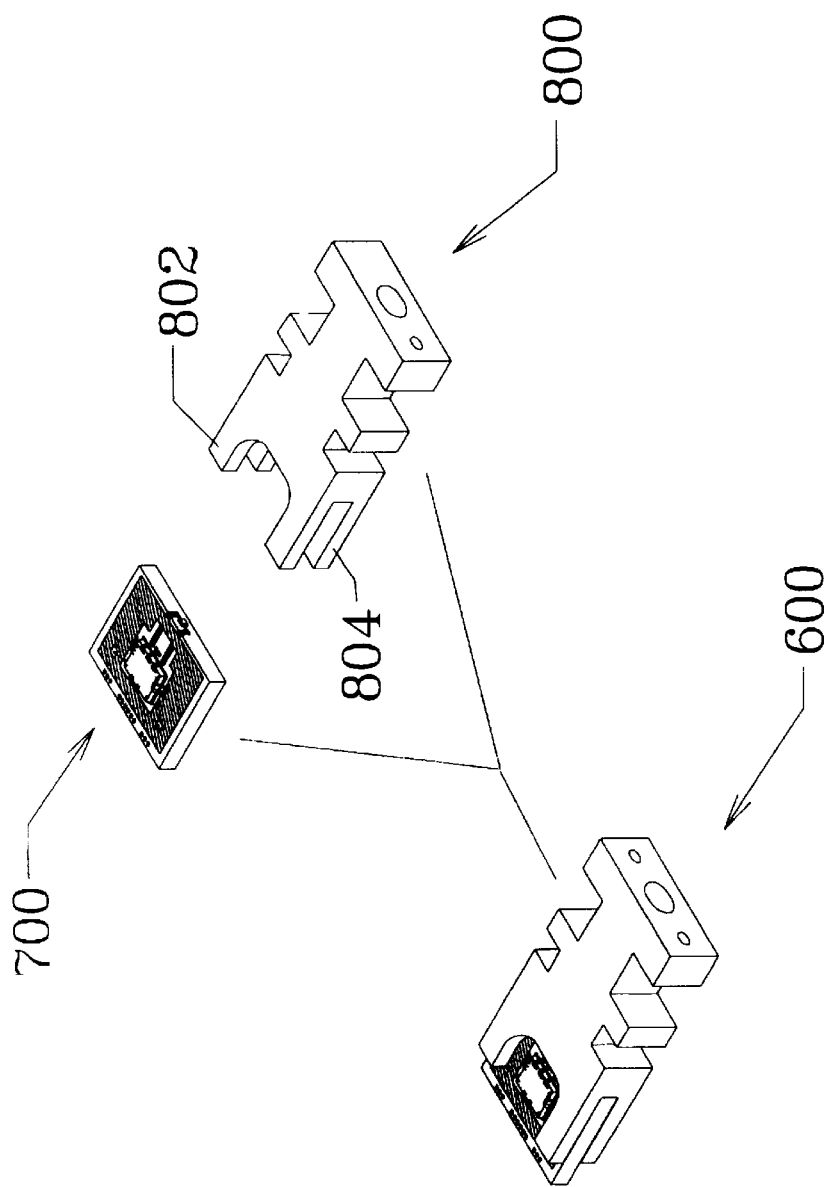
FIG. 6 illustrates the assembly of the nose block and optical sub-assembly of FIG. 1 by exploded view.
Figure 7:
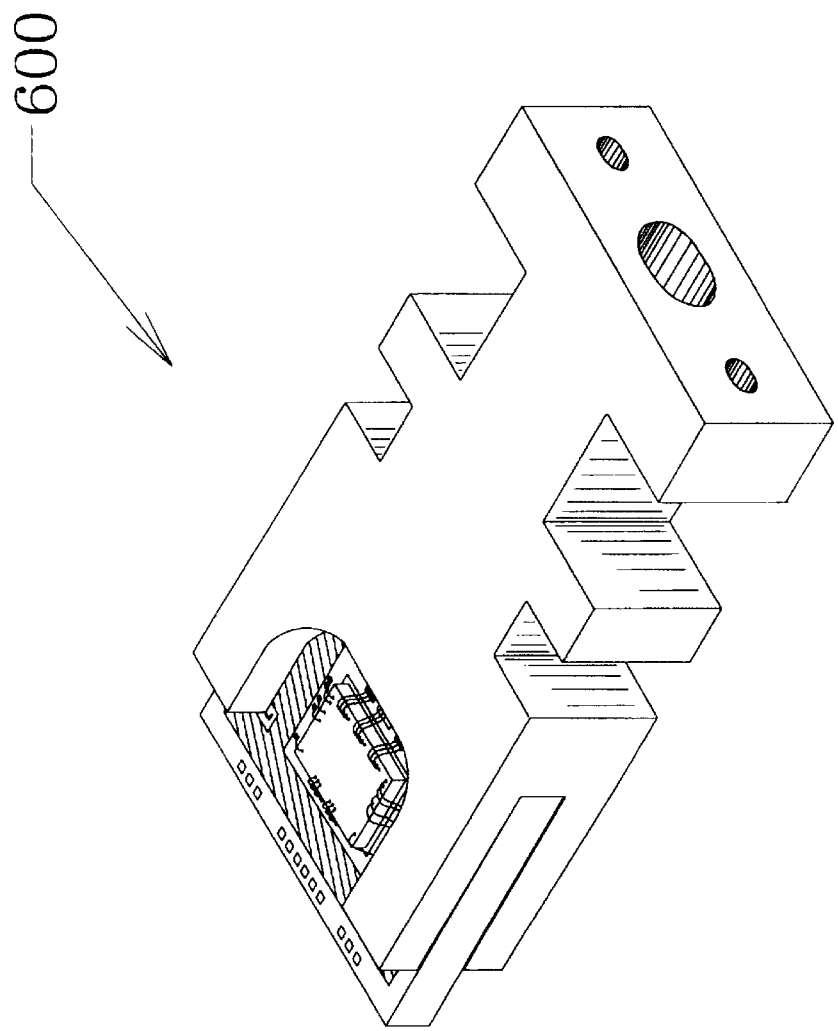
FIG. 7 illustrates the combined assembly of FIG. 1 from a projected view.

FIG. 6 illustrates the assembly of nose block 800 to optical subassembly 700, to form the final optical assembly 600 shown in FIG. 7. This attachment must be done so as to form a good thermal junction therebetween, in order to take full advantage of the intrinsic thermal conductivity offered by aluminum nitride substrate 702. Thermal greases or thermally filled adhesives may be used as appropriate for the particular design.

In the preferred embodiment, an active ferrule is inserted into optic opening 880. Optical sub-assembly 700 is inserted between upper tray 802 and lower tray 804 and UV curable thermally filled adhesive placed therebetween. Optical sub-assembly 700 is energized and then aligned with nose block 800, and the UV curable adhesive quickly cured with ultraviolet energy. Fixation alternatives include thermoplastic and thermoset adhesives as well as various solder alloys to accomplish attachment of optical subassembly 700.

The simplicity of FIGS. 6 and 7 illustrates a significant advantage of the present invention. The reduced parts count lowers cost and simplifies assembly, and also improves thermal and electrical performance. The better performance is achieved through fewer thermal junctions and more proximal electrical placement.

Figure 8:
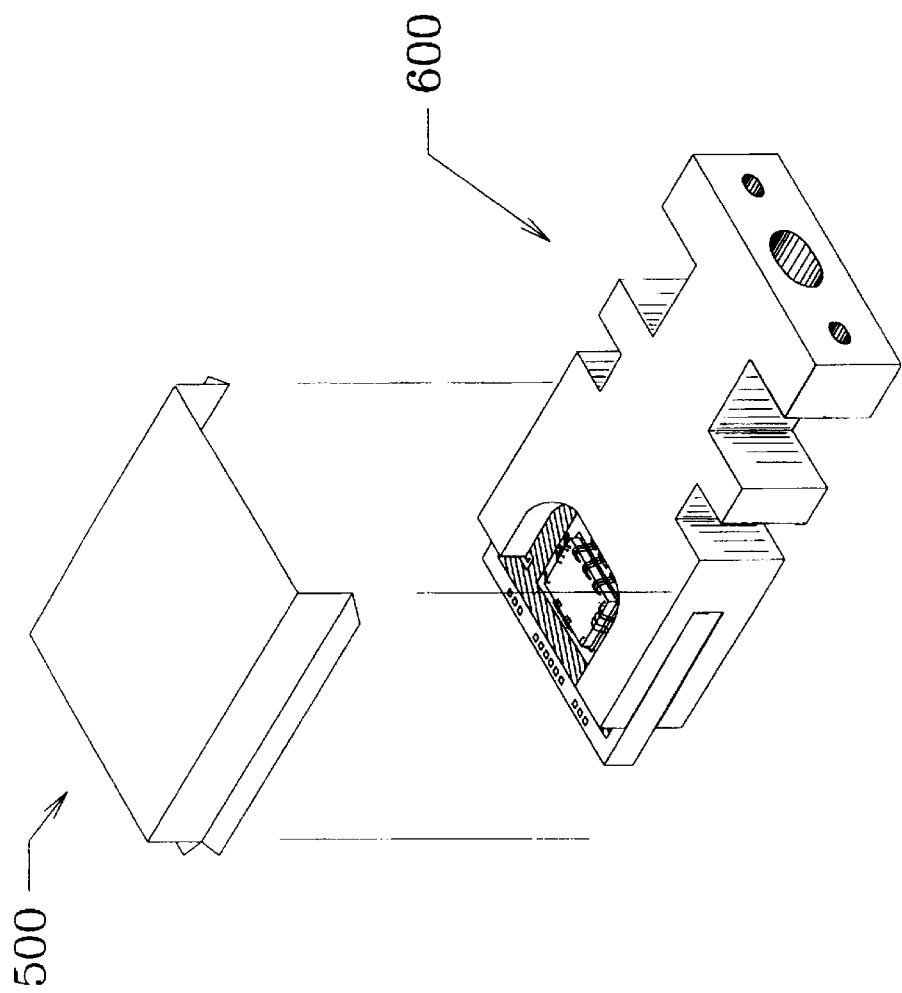
FIG. 8 illustrates the optional shielding cover for the combined nose block and optical subassembly of FIG. 1 by exploded view.
Figure 9:
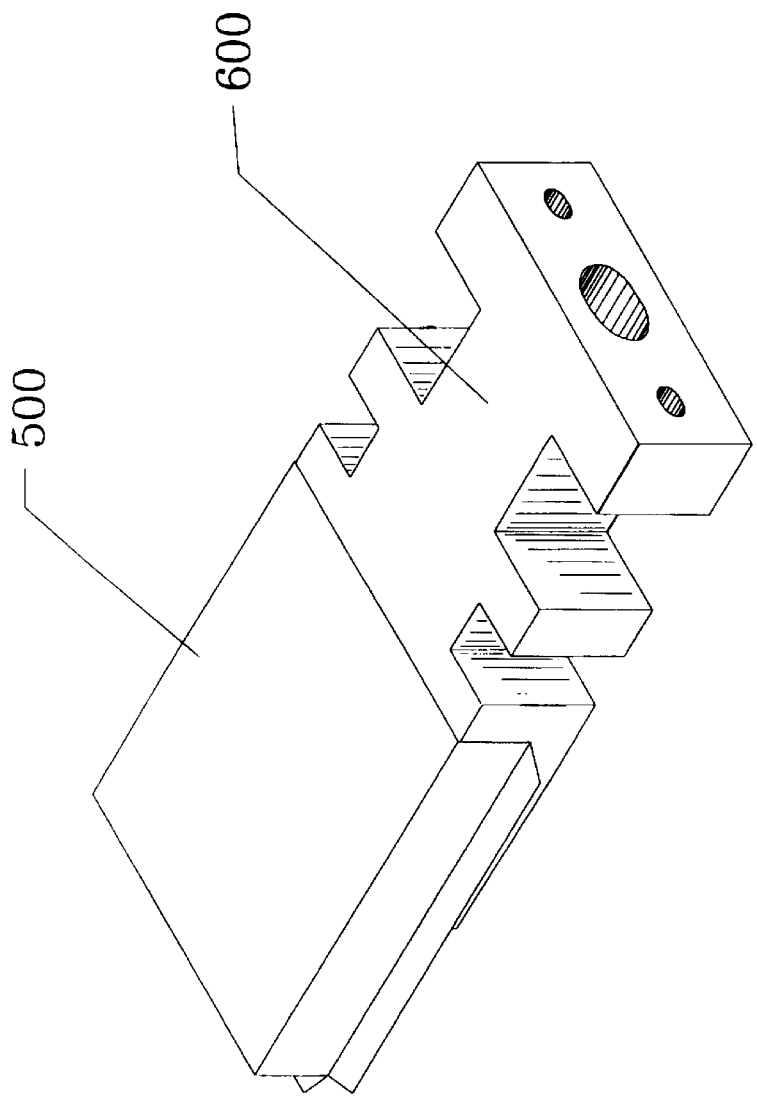
FIG. 9 illustrates the covered combined assembly of FIG. 1.

While cover 100 may provide adequate electrical shielding for the complete package, optional cover 500 shown in FIGS. 8 and 9 may be placed directly over optical assembly 600. Cover 500 will be in very close proximity to high power driver 730 and optical transmitter 750 of the preferred embodiment or, where a receiver is designed, to the low power very sensitive receiver and pre-amplifier, as may be appropriate. In either case, additional electrical shielding is provided where deemed necessary through cover 500, which may be stamped from sheet metal to snap down around optical assembly 600.

Figure 10:
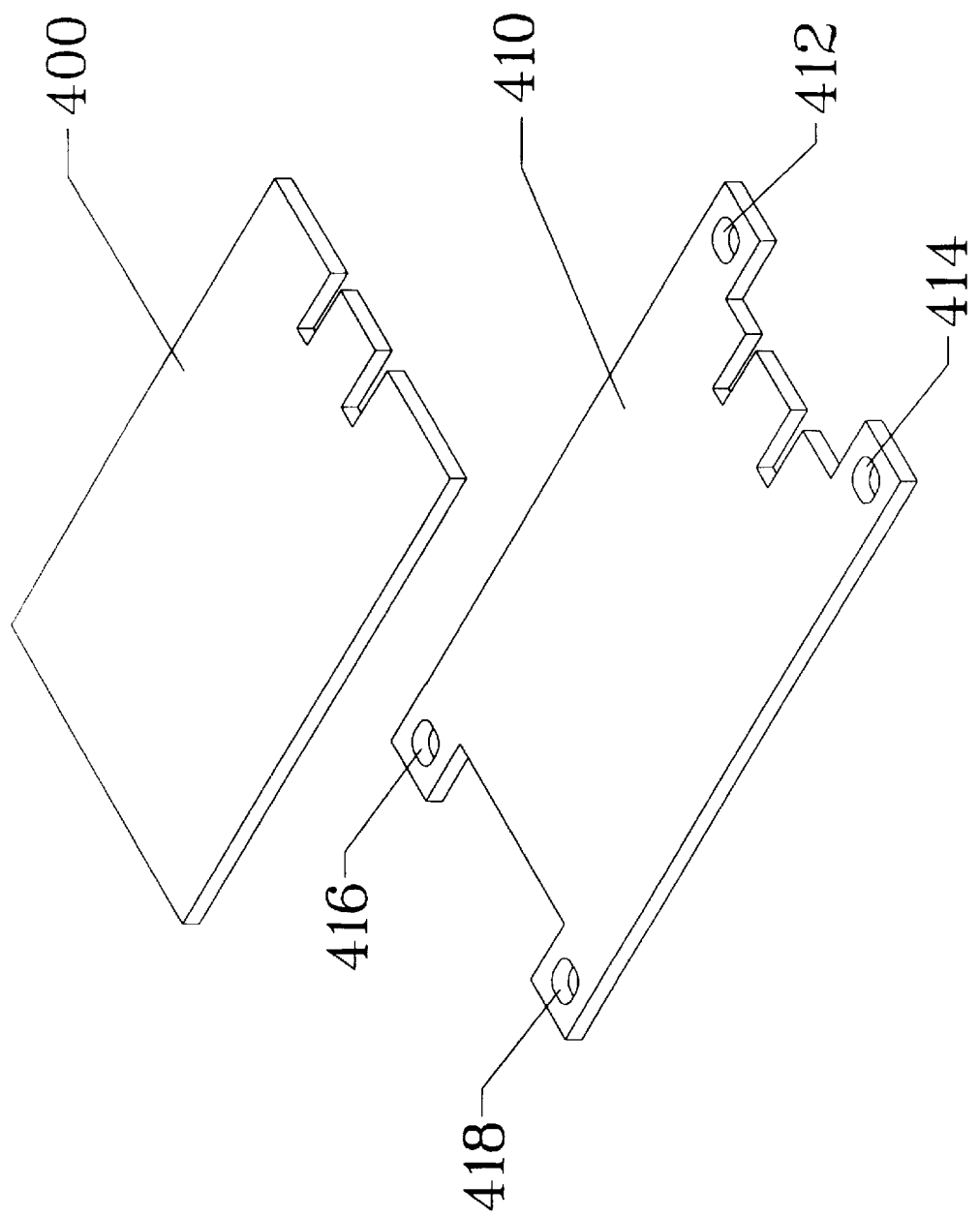
FIG. 10 illustrates alternative base designs.

In FIG. 10, an alternative embodiment for base 400 is presented therewith. Alternative base 410 includes additional mounting holes 412, 414, 416 and 418 which may be used for attaching the package to a surface or additional heat-sinking structure.

Figure 11:
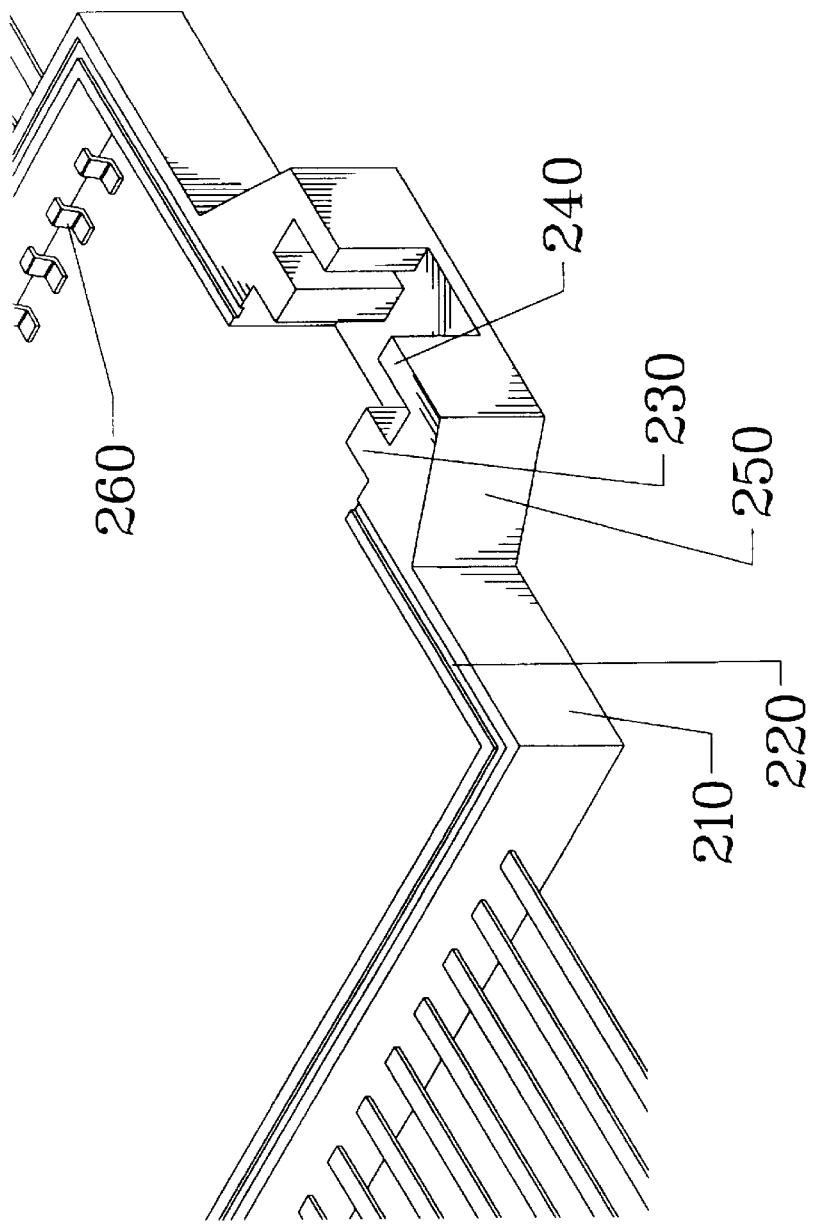
FIG. 11 illustrates the seal ring of FIG. 1 without the nose block, by magnified projected view.

FIG. 11 illustrates the seal ring 200 by magnified perspective view, without optical assembly 600. The vertical nature of protruding flanges 230 and 240 is most apparent therein.

Figure 12:
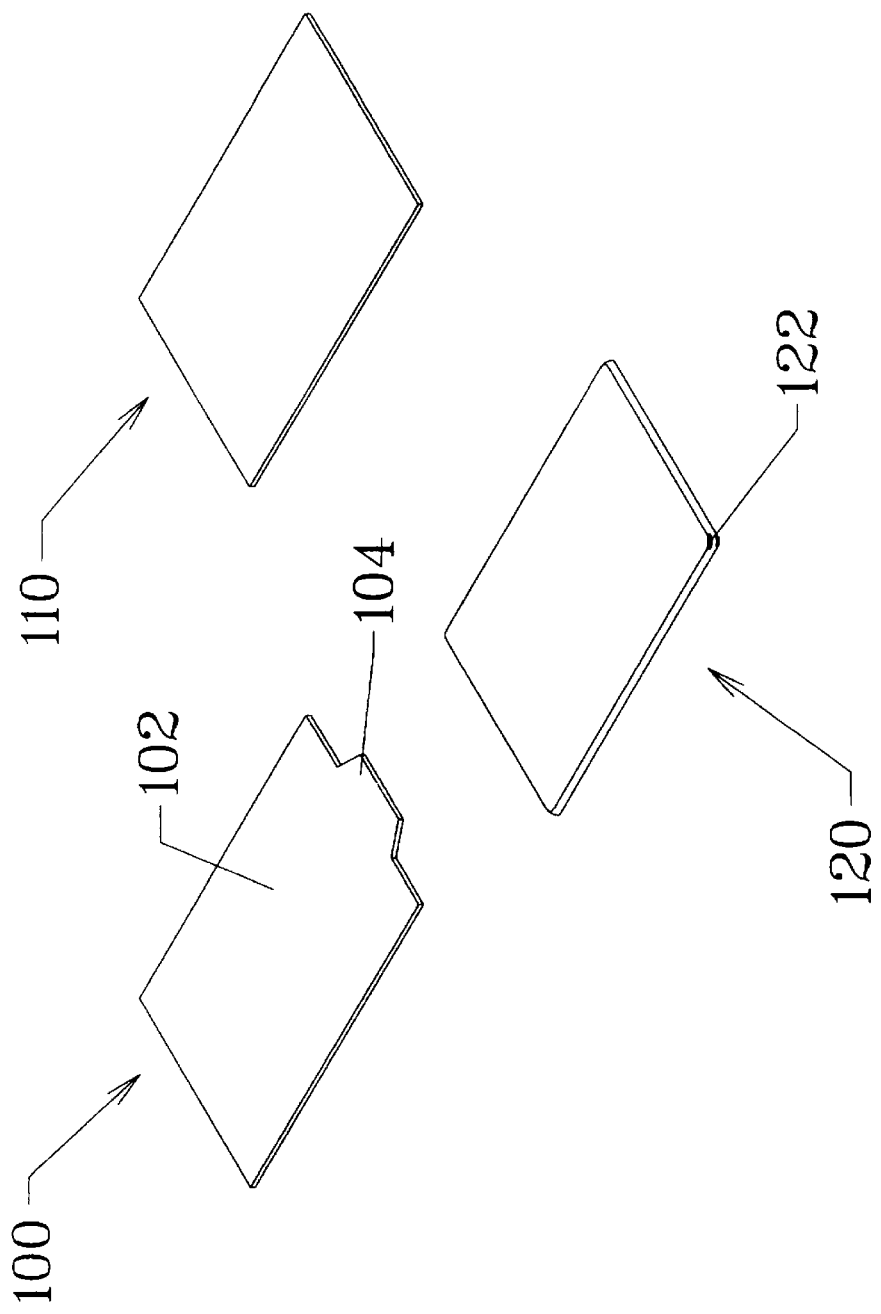
FIG. 12 illustrates several alternative cover designs.

FIG. 12 illustrates several alternative cover designs side by side with preferred cover 100. Cover 100 includes a main body 102 and an extension 104 designed to enclose nose block receptor 250. There is no requirement that receptor 250 be covered, and so either alternative cover 110 or 120 may also be used. Alternative cover 120 is only a slight variant of cover 110 having rounded corners 122 therein.

Figure 13:
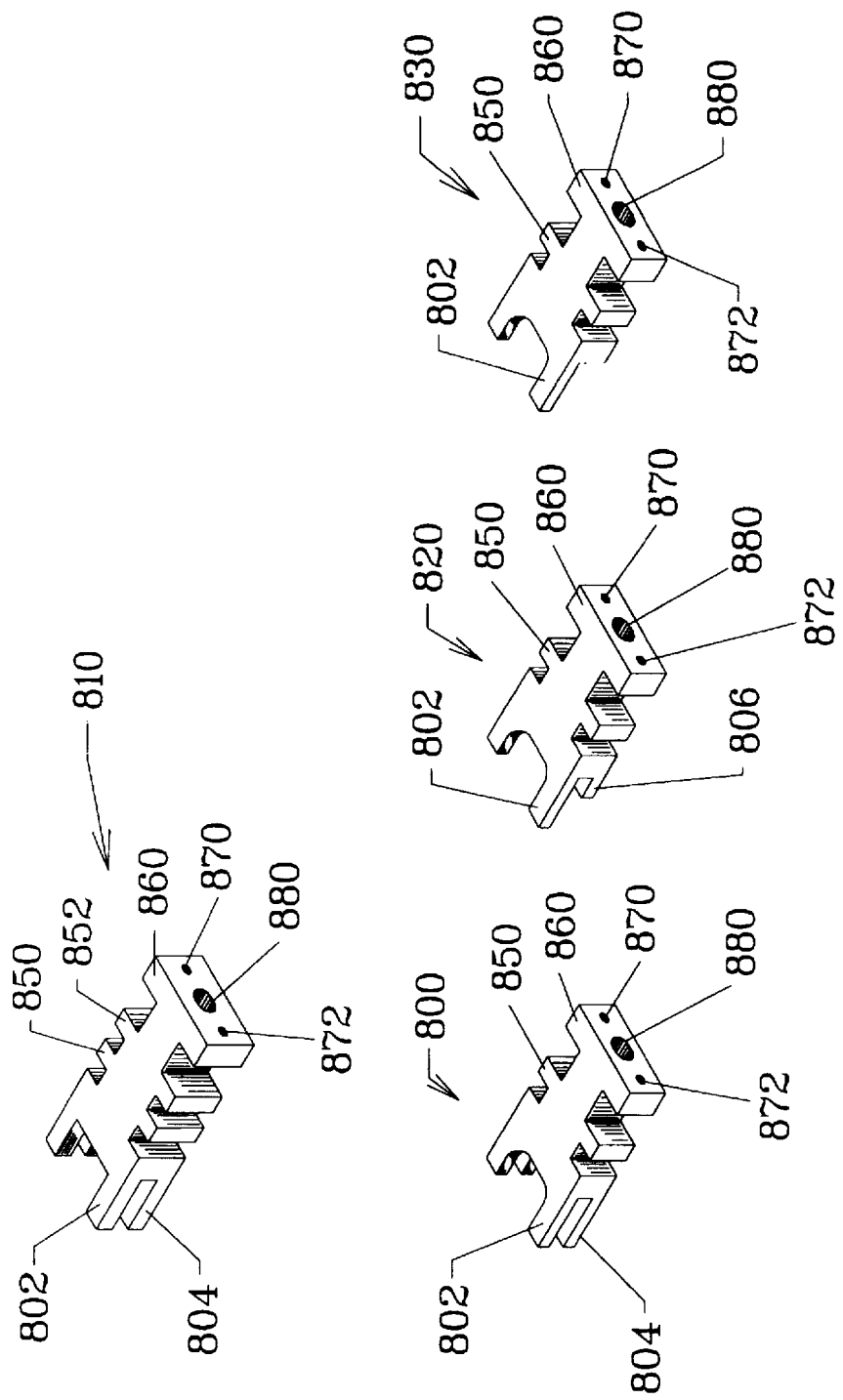
FIG. 13 illustrates several alternative nose block constructions.

FIG. 13 illustrates a variety of alternative nose block configurations. The preferred embodiment is nose block 800, which is referred to as a full capture nose block. The term "full capture" comes from upper tray 802 and lower tray 804 which serve to capture optical subassembly 700 from above and below. During assembly, optical subassembly 700 is slid between trays 802 and 804 as previously described.

First alternative nose block 810 is a full capture nose block, using upper tray 802 and lower tray 804 to retain optical sub-assembly 700. First alternative nose block 810 also includes not just a first protruding flange 850, but also a second protruding flange 852. Second protruding flange 852 can be mated with similar additional protruding flanges in a revised version of nose block receptor 250. The addition of second protruding flange 852 offers a larger sealing area together with more support features. The extra support and sealing might be beneficial in more demanding environments requiring greater strength or more hermeticity.

Second alternative nose block 820 is a partial capture nose block having upper tray 802 and partial lower tray 806. Third alternative nose block 830 has upper tray 802, and does not offer any lower tray. The machining or forming of single-sided capture nose block 830 is simpler than the machining or forming required for full capture nose block 800. However, there is also less surface area in contact with optical subassembly 700, thereby reducing the thermal conductivity of the junction. In areas requiring lower cost and not demanding high thermal conductivity or great strength, nose block 830 might be preferred. At the other extreme, where exceptional strength and higher power levels are required, nose block 810 would be preferred. For general applications requiring modest cost and good thermal conductivity, nose block 800 is most desirable.

Figure 14:
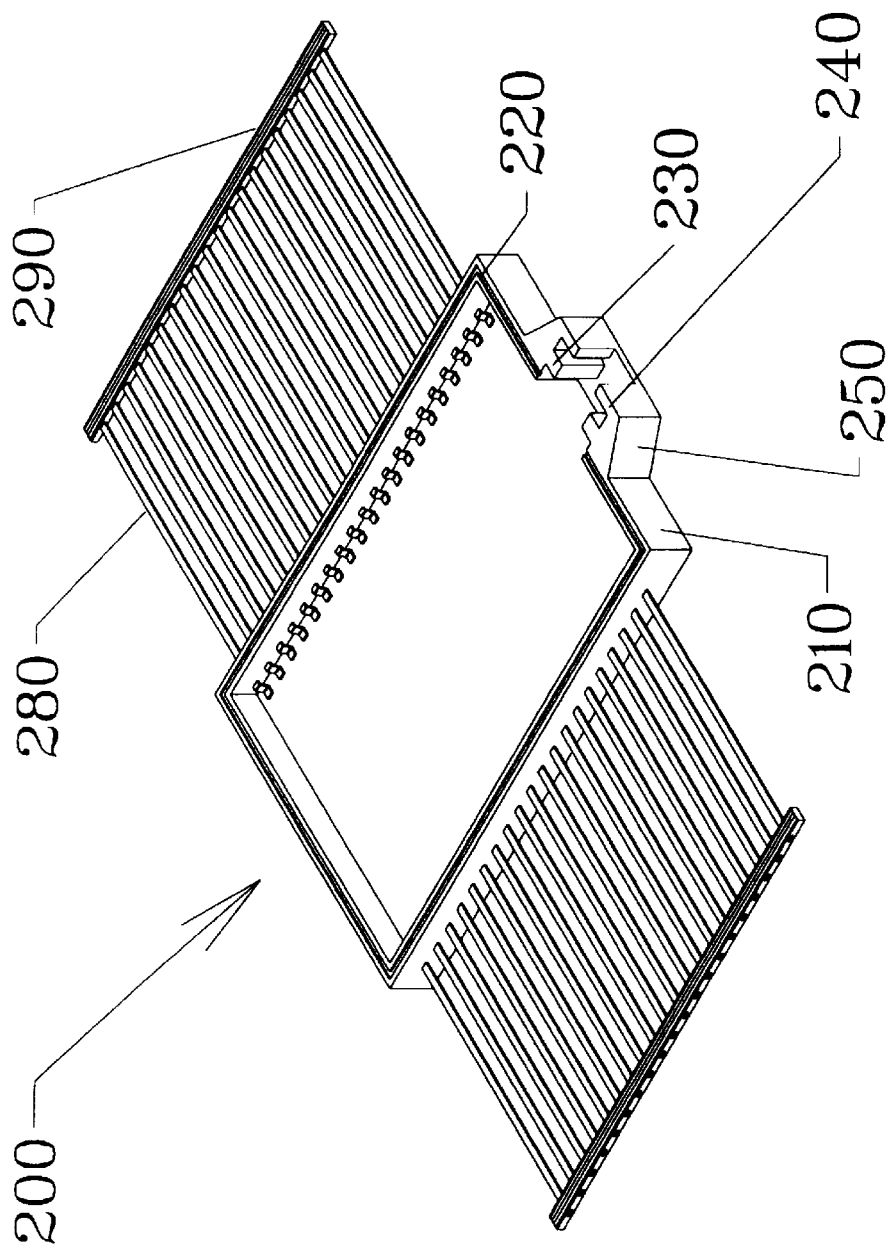
FIG. 14 illustrates the seal ring assembly of FIG. 1 from projected view with all other components removed.

FIG. 14 illustrates the entire seal ring assembly after precision molding. In practice, the preferred embodiment detachable fiber optic connector is quite small. Precision molding is preferred to form seal ring 200, to ensure the precision positioning of each individual lead within lead frame 280.

Figure 15:
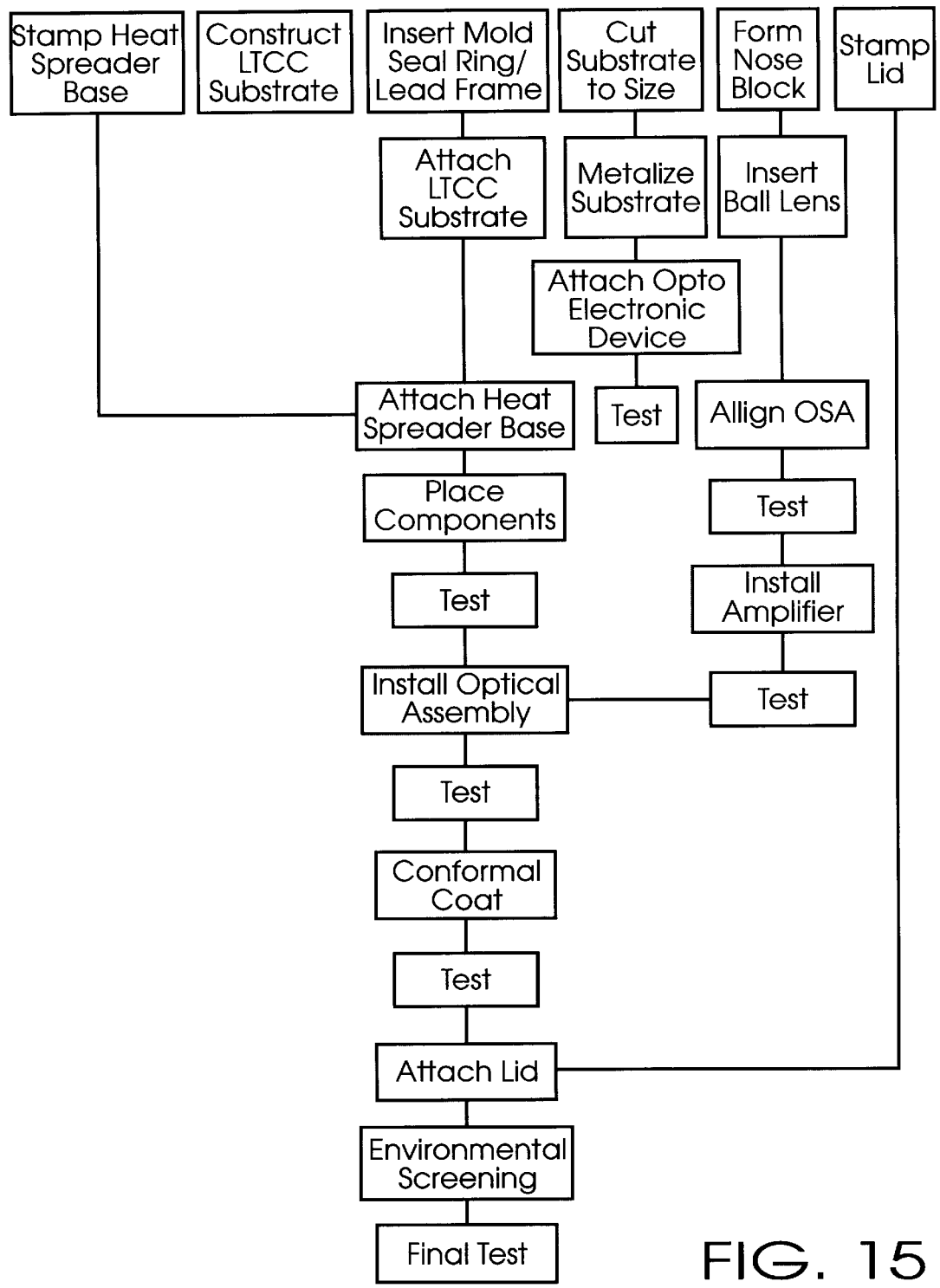
FIG. 15 illustrates an assembly flow chart.

FIG. 15 shows a general assembly flow chart for the preferred embodiment. The individual steps, which are well-known to those of skill in the art, are primarily simple manufacturing processes requiring a minimum of precision. The majority of metal structures are stamped, excepting nose block 800. Lead frame 280 can be etched if desired, though stamping is preferred for volume applications. Nose block 800 in volume production can be precision molded from powdered metal or plastic. Aluminum nitride substrate 702 may be manufactured in continuous strip for higher volume applications, thereby minimizing the production cost for each individual substrate.

While the foregoing details what is felt to be the preferred embodiment of the invention, no material limitations to the scope of the claimed invention are intended. Further, features and design alternatives that would be obvious to one of ordinary skill in the art in light of the present disclosure are considered to be incorporated herein. The number of possible variants is simply too great to attempt to iterate each herein. The scope of the invention is set forth and particularly described in the claims hereinbelow.

We claim:

1. A detachable fiber optic connector comprising:

a base;

a first electrical substrate;

a seal ring encircling said first electrical substrate and engaging said base;

electrical leads passing through said seal ring and electrically connecting to said first electrical substrate;

a second electrical substrate having thereon an optoelectronic device and electronic amplifier circuitry;

a nose block having an optical passage therethrough and also having a first tray for receiving and thermally connecting to said second electrical substrate, said nose block mechanically engaged with said seal ring to form a seal therewith while also passing optical energy through said optical passage, said nose block also thermally coupled to said base and thereby providing the primary thermal dissipation path from said second substrate to said base; and a cover mechanically engaged with said seal ring to form a seal therewith; whereby said base, said seal ring, said nose block and said cover form a sealed enclosure around said first and said second substrates.

2. The detachable fiber optic connector of claim 1 further comprising a protrusion on said nose block having a planar face and a protrusion on said seal ring having a planar face, said nose block protrusion planar face and said seal ring planar face parallel and adjacent.

3. The detachable fiber optic connector of claim 2 wherein said nose block planar face is perpendicular to said optical passage.

4. The detachable fiber optic connector of claim 1 wherein said nose block is further comprised by a second tray spaced from said first tray, said first tray and said second tray retaining said second substrate therebetween.

5. The detachable fiber optic connector of claim 4 wherein said second tray is smaller than said first tray.

6. The detachable fiber optic connector of claim 1 wherein said base and said cover are comprised of an electrically and thermally conductive composition, and said seal ring is comprised of an electrically insulating composition.

7. The detachable fiber optic connector of claim 6 wherein said base is comprised of aluminum.

8. The detachable fiber optic connector of claim 6 wherein said seal ring is comprised of precision molded plastic.

9. The detachable fiber optic connector of claim 1 wherein said second substrate is retained to said nose block by thermally filled adhesive.

10. The detachable fiber optic connector of claim 9 wherein said thermally filled adhesive is ultraviolet curable.

11. The detachable fiber optic connector of claim 1 wherein said nose block is comprised of powdered metal.

12. The detachable fiber optic connector of claim 1 wherein said second electrical substrate is comprised of aluminum nitride.

13. An optical and electronic interface comprising:

attaching means for thermally and mechanically attaching said interface to a support;

interconnecting means for electrically interconnecting and physically supporting electronic components;

converting means for converting energy forms, said energy converting means capable of converting optical energy to electrical energy or electrical energy to optical energy;

supporting means for supporting, electrically interconnecting and primarily thermally connecting to a heat sink said energy converting means;

coupling means for coupling an optical passage to said energy converting means, said coupling means additionally providing primary support for said supporting means and simultaneously forming a part of said primary thermal connection therewith, said optical coupling means directly thermally and mechanically connected to said attaching means; and forming means for forming a sealed enclosure around both of said electronic components and said means for converting energy forms, said enclosure means having passageways therethrough for electrical signals and said optical coupling means.

14. The optical and electronic interface of claim 13 further comprising means for sliding said optical coupling means into said enclosure means along an axis perpendicular to said optical passage.

15. The optical and electronic interface of claim 13 further comprising means for guiding said supporting means along a planar path into engagement with said optical coupling means.

16. The optical and electronic interface of claim 13 wherein said supporting means is composed of aluminum nitride.

17. The optical and electronic interface of claim 13 further comprising a means for electrically shielding said supporting means.

18. The optical and electronic interface of claim 13 wherein said coupling means is composed of powdered metal.

19. The optical and electronic interface of claim 13 wherein said supporting means is attached to said coupling means with ultraviolet curable adhesive.

20. The optical and electronic interface of claim 13 wherein said enclosure means is composed of precision molded plastic.

* * * * *